US012769259B2

(12) United States Patent

Miwa et al.

(10) Patent No.: US 12,769,259 B2
(45) Date of Patent: Oct. 20, 2026

(54) DISPLAY DEVICE AND WATCH

(71) Applicant: CASIO COMPUTER CO., LTD., Tokyo (JP)

(72) Inventors: Jun Miwa, Tokyo (JP); Ryoichi Kunimi, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 315 days.

(21) Appl. No.: 18/535,281

(22) Filed: Dec. 11, 2023

(65) Prior Publication Data

US 2024/0210896 A1 Jun. 27, 2024

(30) Foreign Application Priority Data

Dec. 22, 2022 (JP) ................................ 2022-205519

(51) Int. Cl.
*G04G 17/04* (2006.01)
*G02F 1/13357* (2006.01)
*G04G 9/12* (2006.01)

(52) U.S. Cl.
CPC ..... *G04G 17/045* (2013.01); *G02F 1/133615* (2013.01); *G04G 9/12* (2013.01); *G04G 17/04* (2013.01)

(58) Field of Classification Search
CPC .. G02F 1/133615; G04G 9/12; G04G 17/045; G04G 17/04
See application file for complete search history.

(56) References Cited

U.S. PATENT DOCUMENTS 10,146,076 B2 * 12/2018 Kim ...................... G06F 1/1601
2004/0257496 A1 * 12/2004 Sonoda ............. G02F 1/134309 349/95
2010/0020267 A1 * 1/2010 Kobayashi ........ G02F 1/133603 362/97.3
2016/0238894 A1 * 8/2016 Choi ................. G02F 1/133608
2017/0278468 A1 * 9/2017 Wu ........................ G09G 3/006
2018/0081392 A1 * 3/2018 Kweon ............. G02F 1/133524
2023/0393432 A1 * 12/2023 Joseph .............. G02F 1/133603

FOREIGN PATENT DOCUMENTS

JP H08062426 A 3/1996

* cited by examiner

*Primary Examiner* — Alexander P Gross
(74) *Attorney, Agent, or Firm* — Scully, Scott, Murphy & Presser, P.C.

(57) ABSTRACT

A display device includes: a case; a circuit board having electronic components; and a member, in which the electronic components include a first electronic component and a second electronic component, a distance between an end surface of the first electronic component and the member being shortest among one or more of the electronic components arranged in the first region, a distance between an end surface of the second electronic component and the member being shortest among one or more of the electronic components arranged in the second region, the electronic components being arranged in such a manner that the distance between the end surface of the first electronic component and the member is greater than the distance between the end surface of the second electronic component and the member.

14 Claims, 5 Drawing Sheets

DISPLAY DEVICE AND WATCH

CROSS-REFERENCE TO RELATED APPLICATIONS

This application is based upon and claims the benefit of priority from Japanese Patent Application No. 2022-205519, filed Dec. 22, 2022, the entire contents of which are incorporated herein by reference.

FIELD

The present invention relates generally to a display device and a watch.

BACKGROUND

Conventionally, as a display device, there exists a display device in which an LCD and a light guide plate are stacked in order, and are arranged to face a circuit board on which various electronic components are mounted.

SUMMARY

A display device comprises: a case; a circuit board including a first region and a second region positioned closer to an outer peripheral side than the first region and having electronic components arranged in the first region and the second region; and a member provided inside the case and arranged to face the circuit board, in which the electronic components are arranged to be spaced apart from the member, and the electronic components include a first electronic component in the first region and a second electronic component in the second region, a distance between an end surface of the first electronic component and the member being shortest among one or more of the electronic components arranged in the first region, a distance between an end surface of the second electronic component and the member being shortest among one or more of the electronic components arranged in the second region, the electronic components being arranged in such a manner that the distance between the end surface of the first electronic component and the member is greater than the distance between the end surface of the second electronic component and the member.

A watch according to another embodiment comprises: the display device; a watch case; and a watch module provided inside the watch case.

DETAILED DESCRIPTION

Figure 1:
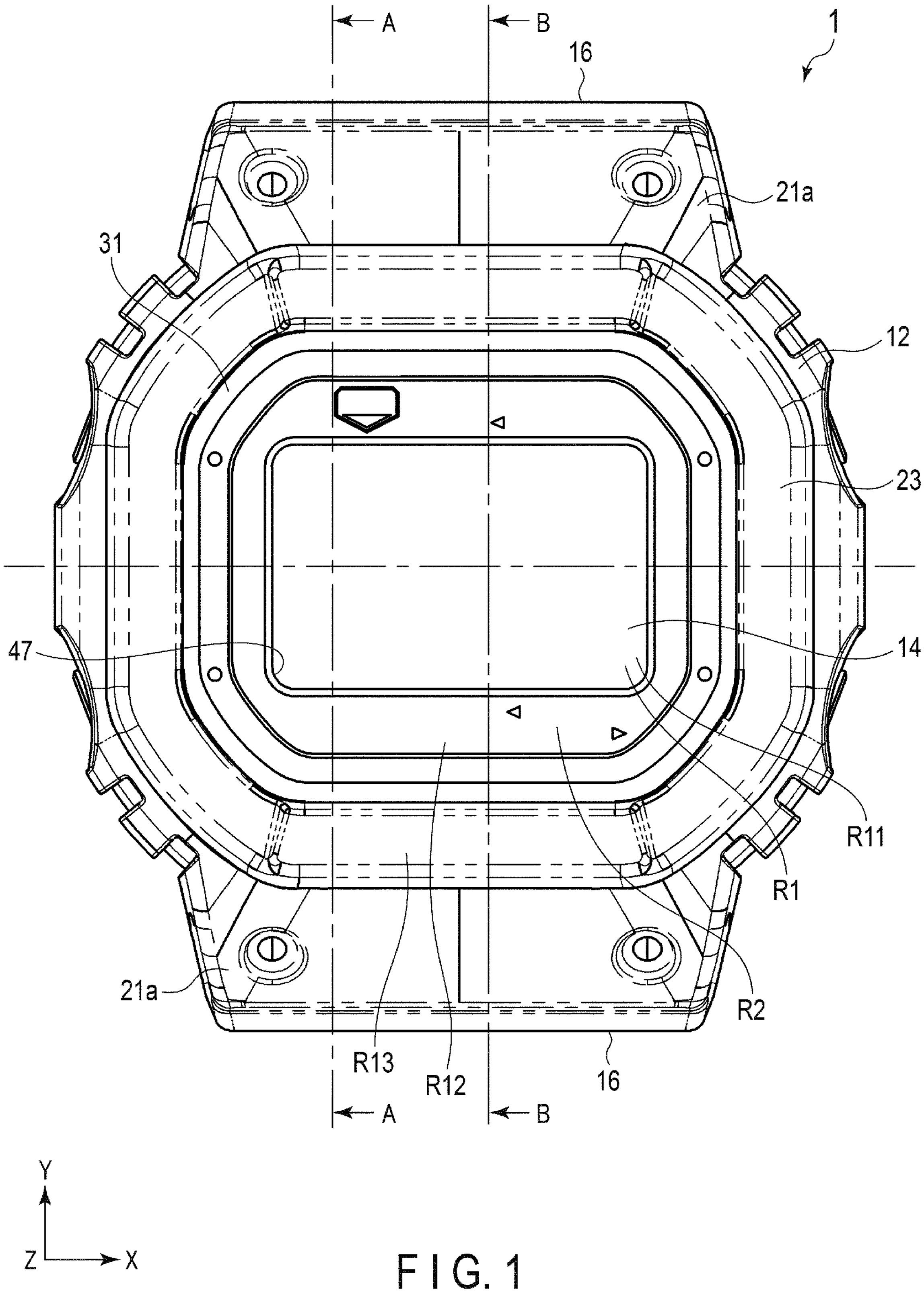
FIG. 1 is a plan view of a watch according to a first embodiment.
Figure 2:
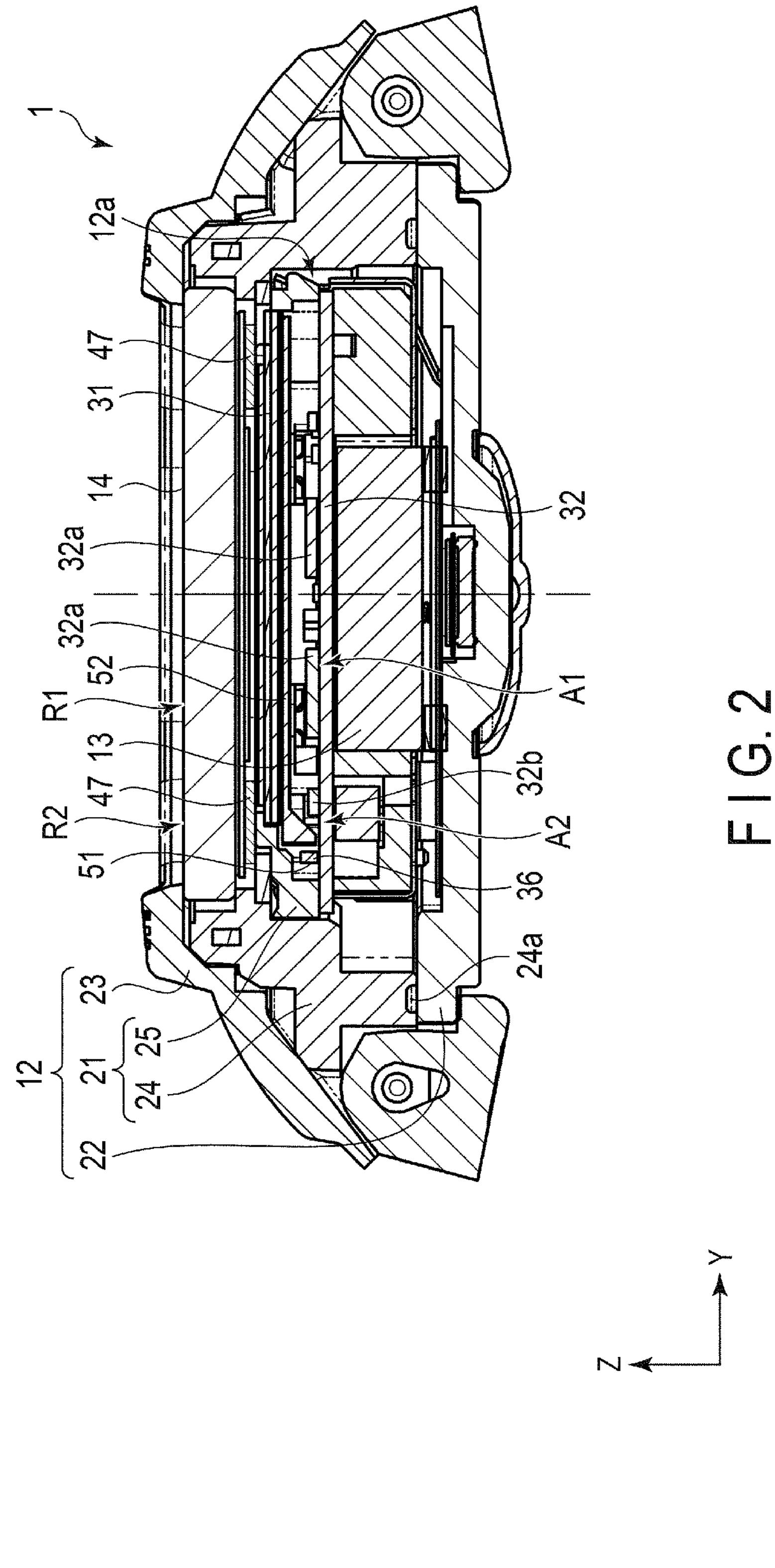
FIG. 2 is a sectional view of the watch taken along the line A-A in FIG. 1 and FIG. 4.
Figure 3:
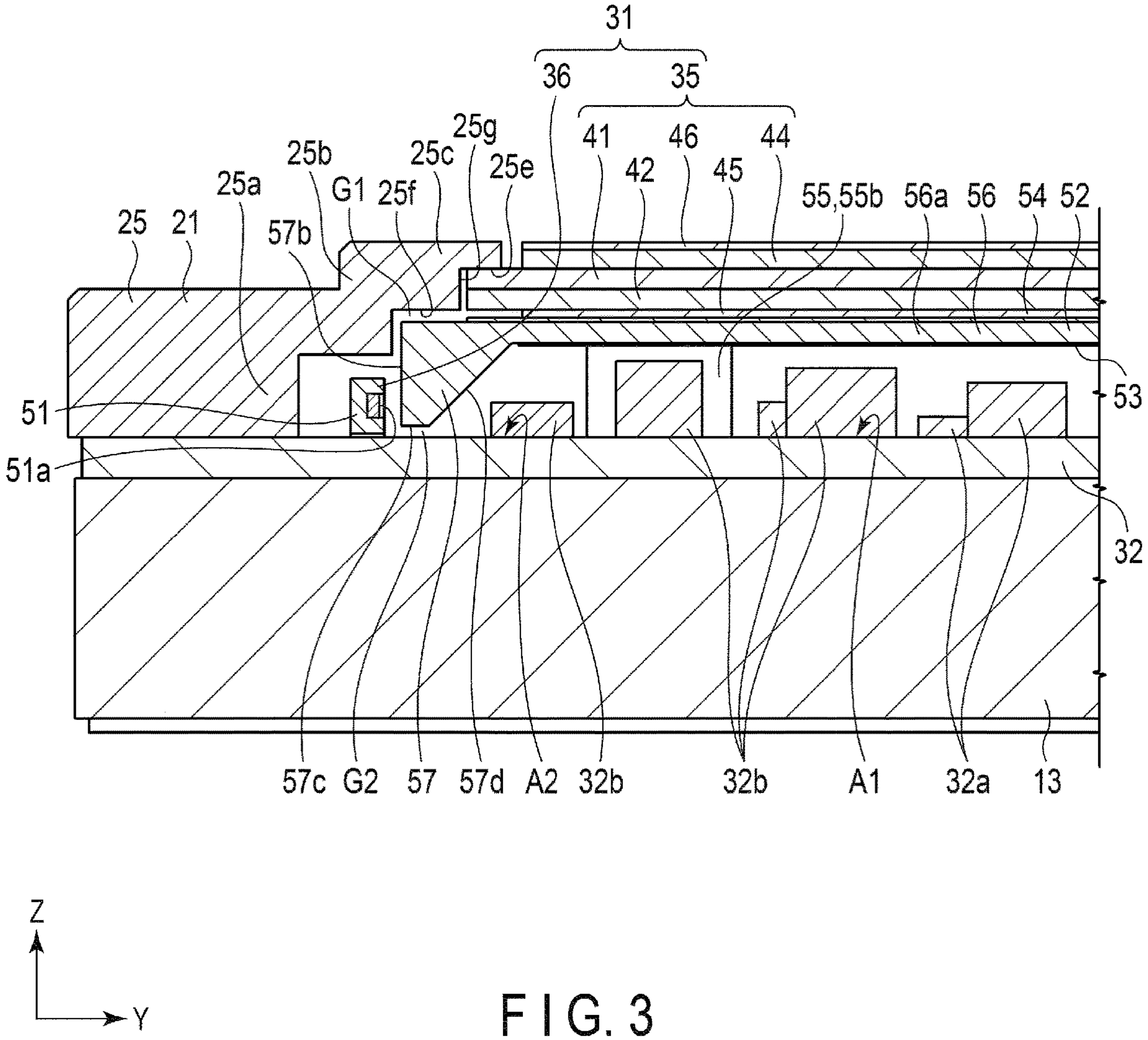
FIG. 3 is a partially enlarged sectional view of the watch.
Figure 4:
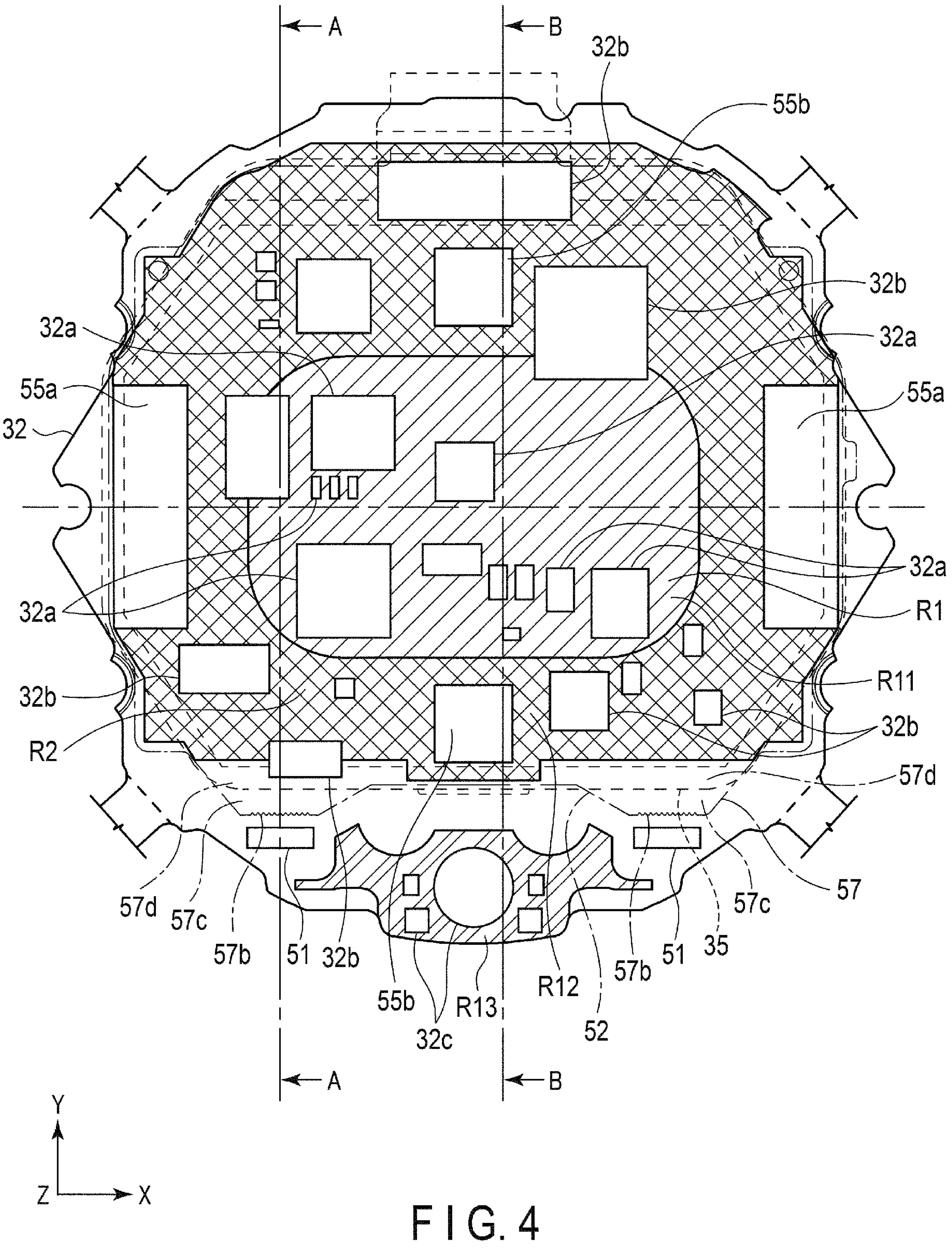
FIG. 4 is a plan view of a circuit board of the watch.
Figure 5:
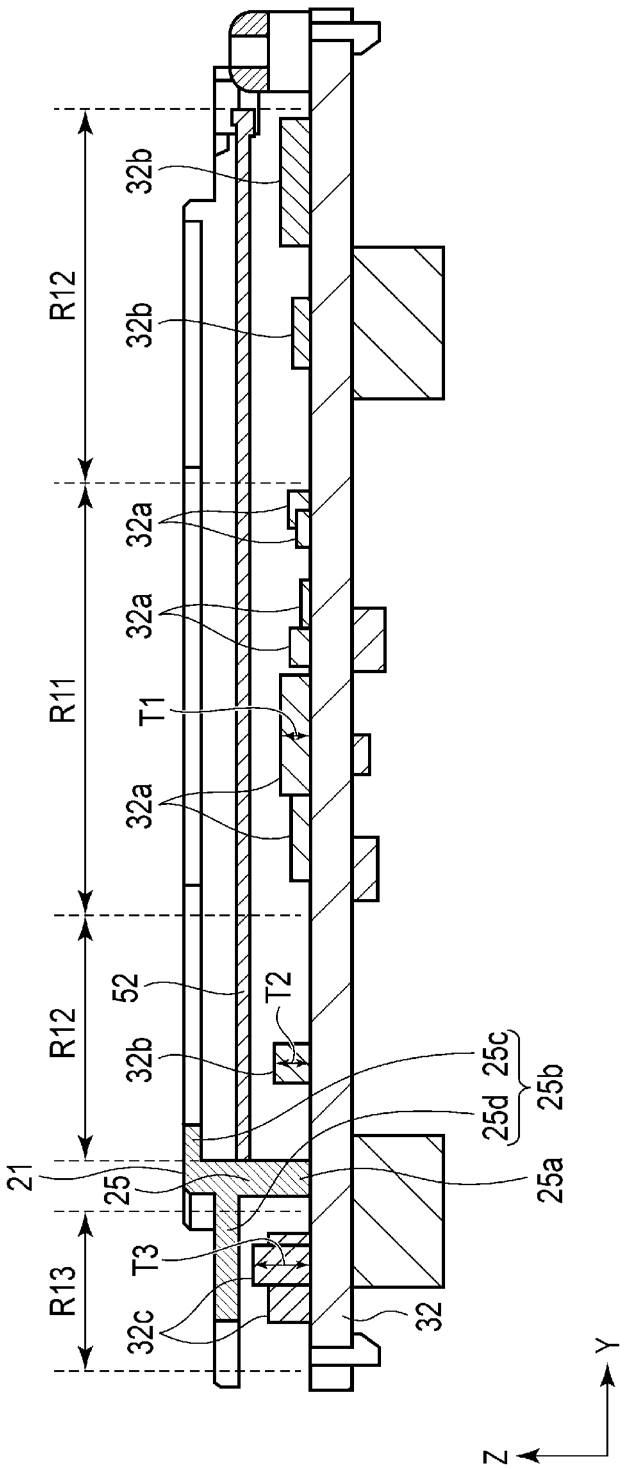
FIG. 5 is a sectional view of the circuit board of the watch taken along the line B-B in FIG. 1 and FIG. 4.

Hereinafter, a display device 31 and a watch 1 according to a first embodiment of the present invention will be described with reference to FIG. 1 to FIG. 5. FIG. 1 is a sectional view showing some portions of a watch 1 according to the first embodiment. FIG. 2 is a sectional view taken along line A-A of FIG. 1 and FIG. 4, and FIG. 3 is a partially enlarged sectional view. FIG. 4 is a plan view of a circuit board, and illustrates each region. FIG. 5 is a sectional view of a circuit board 32 taken along line B-B in FIG. 1 and FIG. 4 (the sectional view as viewed from the 9 o'clock side of a watch 1). The present embodiment describes an example case in which the display device 31 is applied to a dial plate of the watch 1. In the drawings, X, Y, and Z respectively indicate three directions that are perpendicular to each other. The description will assume that the X axis is a horizontal direction connecting 3 o'clock and 9 o'clock of the watch 1, the Y axis is a vertical direction connecting 12 o'clock and 6 o'clock of the watch 1, and the Z axis is a front and back direction of the watch 1. For the sake of explanation, FIG. 4 assumes the circuit board 32 in which a site overlapping a light guide plate 52 or an LCD 35 in a first direction is defined as a facing region (facing portion) and illustrates a mounting region by using diagonal hatching for a central mounting region R11 serving as a first region, using diagonal hatching in two directions that intersect with each other for an outer peripheral mounting region R12 serving as a second region, and using diagonal hatching with different widths for an end region R13 serving as a third region outside the facing region, which does not face the light guide plate 52 or the LCD 35. The present embodiment presents an example in which the central mounting region R11 is arranged in a display region R1 visible externally, and the outer peripheral mounting region R12 is arranged in a non-display region R2 covered with a decorative panel outside of the display region.

The watch 1 shown in FIG. 1 and FIG. 2 is, for example, a wristwatch, and includes a watch case 12 forming an outer shell, a watch module 13 provided inside the watch case 12, and a cover 14 covering a front side of the watch module 13. The watch 1 also includes a watch band 16 connected to two locations on the outer periphery portion of the watch case 12 and a plurality of switches arranged on the outer periphery of the watch case 12.

The watch case 12 includes a housing 21 disposed around the outer periphery portion of the watch module 13, a back cover 22 arranged on the back side of the watch module 13, and an exterior case 23. The watch case 12 forms, by means of the housing 21 and the back cover 22, a container portion 12*a* in which the watch module 13 is arranged. An opening on the front side of the housing 21 is covered with the cover 14. In the present embodiment, the watch case 12 is formed into an octagonal shape.

The housing 21 includes band attachment portions 21*a* at two locations facing each other on the outer periphery portion, for example at the 6 o'clock and 12 o'clock positions, respectively, and the watch band 16 is attached to each of the band attachment portions 21*a*.

The housing 21 is made of metal or resin material. The housing 21 is formed into, e.g., an octagonal frame shape corresponding to the shape of the watch case 12. In the housing 21, the container portion 12*a* that contains therein the watch module 13, etc., is formed. The housing 21 may be configured by combining a plurality of case members. For example, the housing 21 in the present embodiment is configured by assembling a main case member 24 (case) and an inner case member 25 (facing member) provided on the inner peripheral edge of the main case member 24.

The main case member 24 is formed into, e.g., an octagonal annular shape corresponding to the shape of the watch case 12. The main case member 24 covers the outer periphery portion of the watch module 13 and the inner case member 25. A groove 24*a* is formed in the edge of the back surface side of the main case member 24. A waterproof ring that makes a gap between the groove 24a and the back cover 22 airtight is attached to the groove 24a.

For example, the inner case member 25 is provided at the inner peripheral edge of the main case member 24 and supports a circuit board 32 and a display device 31 that correspond to some portions of the watch module 13. The inner case member 25 is formed into a shape corresponding to the shape of the watch case 12, for example, an octagonal frame shape.

The inner case member 25 has a support frame portion 25a supported by the circuit board 32 and a cover wall 25b arranged to face the circuit board 32. For example, the cover wall 25b of the inner case member 25 has a first cover portion 25c facing the second region R12 and covering the outer peripheral edge of the display device 31, and a second cover portion 25d facing the third region R13 and covering an electronic component 32c.

The first cover portion 25c has a plurality of steps corresponding to the arrangement of the components. For example, the cover portion 25c is provided on at least a portion of the inner peripheral edge of the inner case member 25, and has a first surface 25e facing a front side of a peripheral edge of the LCD 35, a second surface 25f facing a front side of a peripheral edge of the light guide plate, and a connecting surface 25g that continuously connects the first surface 25e and the second surface 25f.

The first surface 25e is a plane that is perpendicular to the first direction, which is the thickness direction of the display device 31 and the watch 1, and faces the back surface side. The first surface 25e is arranged to face the front surface side of the peripheral edge of the LCD 35, is in contact with the peripheral edge of the LCD 35, and presses the LCD 35 toward the back side. In the present embodiment, the first surface 25e is arranged to face the outer peripheral edge of the first electrode board 41 at the front side, which constitutes the LCD 35.

The second surface 25f is a plane that is perpendicular to the first direction, which is the thickness direction of the display device 31 and the watch 1, and faces the back surface side. The second surface 25f is arranged to face a front side of a peripheral edge of the light guide plate 52. The second surface 25f faces the surface of the peripheral edge of the light guide plate 52 with a gap G1 therebetween. The second surface 25f is located closer to the back side, which is the other side of the first direction than the first surface 25e. Herein, the distance in the first direction between the second surface 25f and the first surface 25e, that is, the height in the first direction of the connecting surface 25g, which is a step, is approximately equal to the thickness dimensions of the first electrode board 41 and the second electrode board 42 of the LCD 35.

The connecting surface 25g is an inner wall surface that stands upright in the first direction and connects the first surface 25e and the second surface 25f, and is arranged to face the outside of the outer peripheral surfaces of the first electrode board 41 and the second electrode board 42.

The second cover portion 25d is a wall-shaped member that faces the third region R13 and covers the electronic member 32c. As shown in FIG. 5, the support frame portion 25a supported by the circuit board 32 may be arranged in such a manner that a portion of the support frame portion 25a is closer to the inner peripheral side than the remaining portions. For example, as shown in FIG. 5, a portion of the support frame portion 25a is arranged in a site between the second region R12 and the third region R13 and is positioned closer to the center side of the circuit board 32 than the electronic component 32c of the third region R13.

The exterior case 23 is formed into, for example, an octagonal frame shape corresponding to the shape of the watch case 12, and is provided on the front side of the outer periphery of the housing 21. The exterior case 23 is fixed to the housing 21 by means of a connection member such as a screw.

As shown in FIGS. 2 and 3, the watch module 13 includes the display device 31 that displays various types of information such as time, the circuit board 32 (component unit) on which various electronic components (a first electronic component 32a, a second electronic component 32b, a third electronic component 32c) such as an IC and an antenna serving as a drive portion configured to operate the display device 31 are mounted, and spacers 55a and 55b arranged between the circuit board 32 and the display device 31. The watch module 13 further includes a battery, a solar board, various sensor components, and various other components necessary for the watch function. In the present embodiment, each of the display device 31 and the circuit board 32 arranged in a stacked manner is formed into an octagonal shape corresponding to the shape of the watch case 12, for example.

For example, the display device 31 includes the LCD 35 (liquid crystal display panel) of a transmissive type and a lighting device 36. For example, the display device 31 is a digital display unit and includes a digital display function.

The LCD 35 includes a pair of a first transparent electrode board 41 and a second transparent electrode board 42 that are stacked with the liquid crystal material layer interposed therebetween, and a pair of a first polarizing plate 44 and a second polarizing plate 45 that are respectively stacked on the front surface of the first electrode board 41 and the back surface of the second electrode board 42 forming the pair with the first electrode board 41, and an optical sheet 46.

The pair of the first transparent electrode board 41 and the second transparent electrode board 42 have transparent electrodes arranged in a matrix on their facing surfaces. An overlapping portion of the transparent electrodes of the first electrode board 41 and the second electrode board 42 forming a pair constitutes a pixel, so that pixels arranged in a matrix are formed. For example, the LCD 35 is electrically connected to the circuit board 32 and is given a drive signal from the circuit board 32 to display information electro-optically. That is, the LCD 35 displays information such as characters and patterns by pixels arranged in a matrix being selectively shielded from light by selective application of a voltage to the transparent electrodes of the first electrode board 41 and the second electrode board 42. Furthermore, the LCD 35 has the outer periphery portion provided with a decorative panel 47, the center portion provided with the visible region R1 configured to allow display information to be visible from the front side, and the non-display region R2 serving as a cover region formed on the outer periphery. The display region R1 is formed into, for example, a rectangular shape.

The second polarizing plate 45 on the back side, which is the back side of the LCD 35, is placed in close contact with a front side of a diffusion plate 54 of the lighting device 36 in such a manner as to face the diffusion plate 54.

The first electrode board 41 on the front side of the LCD 35 is arranged to face the back side of the first surface 25e of the inner case member 25 at the periphery, and the first polarizing plate 44 on the front side is arranged closer to the inner peripheral side than the cover wall 25b of the inner case member 25.

The lighting device 36 is provided on the back side of the LCD 35 and emits light from the back side of the LCD 35.

The lighting device 36 includes a light emitting body 51, the light guide plate 52, a reflection plate 53, and the diffusion plate 54.

The light emitting body 51 is mounted on the circuit board 32, that is, the surface flush with the electronic components 32*a*, 32*b*, and 32*c*. The light emitting body 51 is provided on the outer peripheral side of the light guide plate 52 on the circuit board 32. Specifically, the light emitting body 51 is arranged to face one side of the light guide plate 52. As in the example shown in FIG. 4, the plurality of light emitting bodies 51 are respectively arranged at two locations in the region on the 6 o'clock side, for example, the vicinities of the 5 o'clock and 7 o'clock positions. Each of the light emitting bodies 51 is, for example, a light emitting diode (LED) element, and emits light in the visible light range, such as white light. The light emitting body 51 is electrically connected to the circuit board 32.

The light emitting body 51 has a light source 51*a* that emits light toward the end surface of the light guide plate 52. The light source 51*a* is arranged at the center of the facing surface of the light emitting body 51, which faces the light guide plate 52. For example, in the present embodiment, the light source 51*a* emits light from the end on the 6 o'clock side toward the 12 o'clock side.

The light guide plate 52 is made of a transparent or semi-transparent light transmitting material and is formed into a plate shape. For example, the light guide plate 52 integrally includes a plate portion 56 formed into a flat plate shape and a convex portion 57 protruding toward the back side at an end of the plate portion 56. For example, the light guide plate 52 is smaller than the outer shape of the circuit board 32 and faces the mounting area at the center of the circuit board 32. For example, the light guide plate 52 is arranged across the first region R11 and the second region R12 to face the circuit board 32, and a site of the light guide plate 52 facing the first region R11 and the second region R12 is formed into a plate shape. Furthermore, in the light guide plate 52 (facing member), the surface on the back side facing the circuit board 32 is in parallel to the facing surface of the circuit board 32.

Furthermore, the light guide plate 52 is larger than the outer shape of the LCD 35. The light guide plate 52 is formed into, for example, an octagonal outer shape. The light guide plate 52 is provided with a predetermined light guide pattern that guides light from the light emitting body 51 in such a manner as to uniformly emit the light from the surface on the front side. The light guide pattern is formed to be denser from one side to the other side in such a manner that its part close to the light emitting body 51 is coarse and its part far from the light emitting body 51 is dense, and is configured in such a manner as to emit an incident light from the upper surface (surface). For example, the light guide pattern may be formed only on a thin portion 56*a* of the light guide plate 52, excluding the convex portion 57, or may be formed in a region of the plate portion 56, including the convex portion 57.

The convex portion 57 is provided at the end of the plate portion 56 on the light emitting body 51 side. The convex portion 57 is a thick protrusion constituted by the end portion of the plate portion 56 protruding toward the back side. The convex portion 57 is configured in such a manner that its thickness dimension in the first direction is set to a predetermined thickness greater than the thickness dimension of the thin portion 56*a* at the center of the plate portion 56.

In the present embodiment, as in one example shown in FIG. 4, the convex portions 57 are respectively provided at the 5 o'clock and 7 o'clock positions of the watch 1. In each of the convex portions 57, a region extending in the horizontal direction protrudes toward the back surface side. For example, the convex portion 57 is arranged in the non-display region R2 that is located outside the central display region R1 allowing display information to be visible as viewed from the front side of the watch, is covered with the decorative panel 47 shown in FIG. 2, and is not visible from the front side.

As shown in FIG. 3, the convex portion 57 of the light guide plate 52 includes a side surface portion 57*b* facing the light emitting body 51, a back-end surface portion 57*c* facing the circuit board, and a slope portion 57*d*, and is configured in such a manner that the cross-section as seen in the horizontal direction connecting the 3 o'clock point and the 9 o'clock point forms a substantially trapezoidal shape.

The side surface portion 57*b* of the convex portion 57 of the light guide plate 52 faces the light emitting body 51. The side surface portion 57*b* forms an incident surface where light enters. The side surface portion 57*b* is provided at a position facing the light source 51*a* in the incident direction (vertical direction) extending from the 6 o'clock side to the 12 o'clock side.

The back-end surface portion 57*c* of the convex portion 57 of the light guide plate 52 is formed into, for example, a flat plate shape. The back-end surface portion 57*c* is provided at a position closer to the back side than the light source 51*a*, and is arranged on the circuit board 32 with a predetermined gap G2 therebetween in such a manner as to face the circuit board 32. The back-end surface portion 57*c* is arranged at a position closer to the circuit board 32 (the back side of the watch 1) than the light source 51*a* of the light emitting body 51 in the first direction.

The slope portion 57*d* of the convex portion 57 of the light guide plate 52 is an inclined surface that is inclined from the inner end of the back-end surface portion 57*c* toward the center. The slope portion 57*d* is constituted by the surface of the back side of the plate portion 56 extending obliquely toward the circuit board 32, and forms a surface inclined with respect to the first direction and a surface direction perpendicular to the first direction. The slope portion 57*d* is arranged to face the circuit board 32 in the first direction.

The reflection plate 53 is provided on the back side of the light guide plate 52 and is formed into a flat plate shape. The reflection plate 53 reflects the light leaking from the plate portion 56 toward the light guide plate 52 and guides it to the light guide plate 52 again.

The diffusion plate 54 is a light-transmitting plate that is arranged between the light guide plate 52 and the LCD 35 and has light transmissivity. The diffusion plate 54 is arranged in such a manner that its front surface is in close contact with the back surface of the LCD 35 and its back surface is in close contact with the surface of the light guide plate 52. The diffusion plate 54 diffuses light from the light guide plate 52 and uniformly emits the light from the upper surface. By the diffusion plate 54 being interposed between the light guide plate 52 and the LCD 35 in the first direction, which is the facing direction, the gap G1 corresponding to the thickness of the diffusion plate 54 and the second polarizing plate 45 is created between the second surface 25*f* and the surface of the peripheral edge of the light guide plate 52.

The circuit board 32 is a board provided with a predetermined wiring pattern and having the plurality of electronic components (the first electronic component 32*a*, the second electronic component 32*b*, and the third electronic component 32*c*) mounted on its surface. The circuit board 32 is arranged to face the back-surface side of the light guide plate 52. In FIG. 4, the LCD 35 arranged to be stacked on the circuit board 32 is indicated by a broken line, and the light guide plate 52 is indicated by a chain line.

Herein, as shown in FIG. 4 and FIG. 5, the outer peripheral mounting region R12 (second region) is positioned closer to the outer peripheral side than the central mounting region R11 (first region), and the end region R13 (third region) is positioned on the outer peripheral side of the outer peripheral mounting region R12 (second region). The central mounting region R11 (first region) is a region including the center of the circuit board 32. In plan view of the display device 31 from a viewing side, the outer peripheral mounting region R12 (second region) is configured to cover the entire outer periphery of the central mounting region R11 (first region). On the other hand, the end region R13 (third region) is arranged at a portion on the outer peripheral side of the outer peripheral mounting region R12 (second region), that is, on the 6 o'clock side in analog time. Furthermore, in plan view of the display device 31 from a viewing side, the end region R13 (third region) is arranged between the two light emitting bodies 51. The end region R13 (third region) is positioned on the outer peripheral side of the outer peripheral mounting region R12 (second region).

On the circuit board 32, the electronic components 32*a*, 32*b*, and 32*c* are arranged to be spaced apart from the light guide plate 52 serving as the facing member in the first direction. On the circuit board 32, the first electronic component 32*a*, the second electronic component 32*b*, and the third electronic components 32*c* are arranged in such a manner that an electronic component at a position closer to the center is shorter. For example, on the circuit board 32, assume that a site overlapping at least one of the LCD 35 and the light guide plate 52 in the first direction is the facing region (facing portion). In this facing region, the maximum height T2 of one or more second electronic components 32*b* arranged in the outer peripheral mounting region R12 (second region) outside of the central mounting region R11 (first region) arranged in the center is greater than the maximum height T1 of one or more first electronic components 32*a* arranged in the central mounting region R11. Furthermore, the maximum height T3 of one or more third electronic components 32*c* in the end region R13 (third region) that is outside of the facing region and does not overlap the LCD 35 and the light guide plate 52 is greater than the maximum height T2 of one or more second electronic components 32*b* in the outer peripheral mounting region R12.

In other words, among the plurality of electronic components, one or more first electronic components 32*a* arranged in the central mounting region R11 (first region) are smaller in maximum size in the facing direction than one or more second electronic components arranged in the outer peripheral mounting region R12 (second region), and one or more third electronic components 32*c* arranged in the outer peripheral mounting region R12 (second region) are smaller in maximum size in the facing direction than one or more second electronic components 32*b* arranged in the end region R13.

For example, the central mounting region R11 and the outer peripheral mounting region R12 are respectively set to the display region R1 in which, for example, the display device 31 is visible from the front side, and the non-display region R2. The present embodiment presents an example in which a boundary between the central mounting region R11 and the outer peripheral mounting region R12 is in the same position as that of a boundary between the display region R1 and the non-display region R2, for example.

For example, the maximum height T1 of the first electronic component 32*a* in the central mounting region R11 is set to 0.9 mm, the maximum height T2 of the second electronic component 32*b* in the outer peripheral mounting region R12 is set to 1.1 mm, and the maximum height T3 of the third electronic component 32*c* in the end region R13 is set to 1.5 mm. That is, the electronic components (the first electronic component 32*a*, the second electronic component 32*b*, and the third electronic components 32*c*) on the circuit board 32 and the light guide plate 52 are arranged in such a manner that a gap between an electronic component and the light guide plate 52 becomes larger at a position closer to the center.

The plurality of spacers 55*a* and 55*b* are provided between the circuit board 32 and the reflection plate 53 of the lighting device 36, and regulate the distance between the light guide plate 52 and the circuit board 32 in the first direction. The spacer 55 is made of a cushioning member such as urethane formed into, for example, a rectangular block shape. As shown in FIG. 4, for example, the plurality of spacers 55 are provided outside the display region R1 on the circuit board 32.

As shown in FIG. 3, for example, the dimensions of the spacers 55*a* and 55*b* in the first direction are set to a height that allows compression of the light guide plate 52 to be suppressed by forming the gap G2 between the back-end surface portion 57*c* of the convex portion 57 of the light guide plate 52 and the surface of the circuit board 32.

The spacers 55*a* and 55*b* are attached to predetermined locations on the outer periphery site of the circuit board 32. For example, as shown in FIG. 4, in the present embodiment, the spacers 55*a* and 55*b* are provided at a total of four locations on both sides in two directions, the vertical direction and the horizontal direction, that is, at positions corresponding to 12 o'clock, 3 o'clock, 6 o'clock, and 9 o'clock. As an example, the present embodiment includes two types spacers including the first spacers 55*a* and the second spacers 55*b* that are different in size. For example, the large first spacers 55*a* are respectively arranged at 3 o'clock and 9 o'clock positions on both sides in the horizontal direction. Small second spacers 55*b* are respectively provided at 6 o'clock and 12 o'clock positions on both sides in the vertical direction. For example, in the present embodiment, a terminal for connecting a connector is arranged at the 12 o'clock position on one side in the vertical direction, and each of the spacers 55 is arranged at a position closer to the center than this terminal.

The cover 14 is a transparent member made of, for example, inorganic glass such as $SiO_2$ glass. For example, the cover 14 is a transparent watch glass formed into an octagonal shape, and is placed on the front side of the watch module 13 to cover the watch module 13. For example, the cover 14 is supported on the inner peripheral edge of the opening on the front side of the housing 21. A packing is interposed between the outer periphery of the cover 14 and the inner periphery edge of the housing 21.

The watch band includes a coupling mechanism such as a pair of band members or buckles, which are respectively connected to two facing locations on the outer periphery of the watch case 12.

The switch is provided on, for example, the outer periphery portion of the case, and performs mode changing, time adjustment, etc., of the watch module 13 in response to an operator's pressing operation.

In a process of assembling the display device, for example, the LCD 35 is set from the back side of the container portion 12*a* of the housing 21. At this time, the outer periphery portion of the first electrode board 41 on the front side of the LCD 35 is arranged to face the first surface 25*e* of the housing 21 and is supported thereby. The first polarizing plate 44 and an optical sheet 46 are located closer to the inner peripheral side than the cover wall 25*b* and are arranged on the front side of the first surface 25*e*. The circuit board 32 on which the first electronic component 32*a*, the second electronic component 32*b*, and the third electronic component 32*c* are mounted and to which the spacer 55 is attached in advance is assembled into the lighting device. At this time, the light guide plate 52 and the LCD 35 are pushed up to the front side by the spacer 55*a*.

Generally, in the display device 31 in which the circuit board 32 on which the LCD 35, the light guide plate 52, and the various electronic components 32*a* and 32*b* are mounted is stacked, upon deformation of the light guide plate 52 due to an external force, etc., the electronic components 32*a* and 32*b* interfere with the light guide plate 52 or a casing (the inner case member 25 of the housing 21), which causes damage to the electronic components 32*a* and 32*b*.

The display device 31 according to the present embodiment can suppress interference of the electronic components 32*a* and 32*b* with the members (the light guide plate 52 and the inner case member 25) arranged in the case (housing 21).

That is, with the display device 31 according to the present embodiment, by setting the first electronic component 32*a* in the central mounting region R11 to be smaller in height than the second electronic component 32*b* in the outer peripheral mounting region R12 which is hardly affected by deflection, and setting the third electronic component 32*c* in the end region R13 outside of the facing region that does not overlap at least one of the LCD 35 and the light guide plate 52 in the first direction on the circuit board 32 to be great in height, impact resistance can be improved to realize higher-density mounting and higher functionality. That is, by setting a large gap from the light guide plate 52 in a site which is arranged to be stacked with the LCD 35 and the light guide plate 52 and is likely to be affected by deflection due to impact, buffering between the light guide plate 52 and the first electronic component 32*a* can be prevented.

The embodiment is discussed merely as an example, which should not be considered to restrict the scope of invention. Furthermore, the features in a plurality of embodiments may be combined.

(Modification Examples)

For example, in the example described in the above embodiment, the surface of the circuit board 32 is flat and the first region, the second region, and the third region are increased in height in this order, that is, the electronic components are different in maximum height between regions; however, the present invention is not limited to this example. Any configuration is acceptable as long as a distance between the end face of the electronic component having the maximum height in each region and the light guide plate 52 (facing member) facing the electronic component concerned or the second cover portion 25*d* of the inner case member 25 (facing member) of the housing 21 decreases in order of the first region, the second region, and the third region.

For example, the display device 31 may be configured to have a plurality of circuit boards 32 that are different in height in the first direction or to have the circuit board 32 which is arranged to be inclined relative to the face of the LCD 35 and has a height that varies between sites. In such a case also, supposing that the electronic components arranged in the first region include a first electronic component, a distance between an end surface of the first electronic component and the light guide plate 52 (facing member) being shortest, and the electronic components arranged in the second region include a second electronic component, a distance between an end surface of the second electronic component and the light guide plate 52 (facing member) being shortest, the electronic components are arranged in such a manner that the distance between the end surface of the first electronic component and the light guide plate is greater than the distance between the end surface of the second electronic component and the light guide plate. By this, even if the light guide plate 52 is deformed due to an external force, etc., the electronic components can be prevented from interfering with the light guide plate 52 (facing member) facing them, and furthermore, a mounting area can be effectively utilized. Thus, higher functionality can be achieved.

Similarly, by arranging the electronic components in such a manner that a distance between the end surface of the electronic component having the maximum height in the second region and the light guide plate 52 (facing member) facing the electronic component concerned is greater than a distance between the end surface of the electronic component having the maximum height in the third region and the second cover portion 25*d* of the inner case member 25 (facing member) of the housing 21 facing the electronic component concerned, the electronic components can be prevented from interfering with the respective members, and furthermore, the mounting area can be effectively utilized. Thus, higher functionality can be achieved.

As described above, a display device may include: a circuit board having electronic components mounted on a first region, a second region positioned closer to an outer peripheral side than the first region, and a third region positioned closer to the outer peripheral side than the second region; and a member (a light guide plate, a housing) arranged to face the circuit board, in which the electronic components include a first electronic component in the first region, a second electronic component in the second region, and a third electronic component in the third region, the first electronic component having a shortest distance between its end surface and the member among one or more of the electronic components arranged in the first region, the second electronic component having a shortest distance between its end surface and the member among one or more of the electronic components arranged in the second region, the third electronic component having a shortest distance between its end surface and the member among one or more of the electronic components arranged in the third region, the electronic components being arranged in such a manner that the distance between the end surface of the first electronic component and the member is greater than the distance between the end surface of the second electronic component and the member and that the distance between the end surface of the second electronic component and the member is greater than the distance between the end surface of the third electronic component and the member.

Furthermore, the example described above includes the light emitting body 51 at one end; however, the present invention is not limited to this. For example, the present embodiment may be configured in such a manner that the light emitting body 51 is arranged in the center or both end portions of the LCD 35 or the light guide plate 52.

Furthermore, the shapes and positions of the spacers 55*a* and 55*b* are not limited to those in the above embodiment.

For example, in the case where the reflection plate 53 has deflection in a predetermined roll direction, the deflection of the reflection plate 53 can be suppressed by providing the spacers 55*a* and 55*b* on at least both sides in the roll direction.

The above embodiment described the example in which different heights are respectively set for the three regions R11, R12, and R13; however, different heights may be respectively set for four or more steps. Furthermore, the above embodiment described the examples in which a boundary between regions is arranged in each of the display region R1 and the non-display region R2; however, the boundary is not limited to this. For example, while a distance from a support position by the housing 21 or a distance from the center is used as a reference, the central mounting region R11, the outer peripheral mounting region R12, and the end region R13 may be divided.

Furthermore, the LCD 35 was described as an example of the display portion; however, the display portion is not limited to this. The display portion may be, for example, an organic EL display.

In the present application, even if the light guide plate is deformed due to an external force, the tallest electronic component in the central region in which the light guide plate is prone to be deflected is shorter than the tallest electronic component in the outer peripheral region in which the small deflection amount of the light guide plate is small. This can suppress interference with the light guide plate. Furthermore, since the housing is hardly deformed as compared to the light guide plate, the tallest electronic component in the outer peripheral region in the position overlapping the light guide plate in plan view is shorter than the tallest electronic component in the end region in the position closer to the outer peripheral side and overlapping the housing. This can suppress interference with the light guide plate.

Although several embodiments of the present invention have been described, the specific configuration, structure, positional relationship, etc. shown in the above embodiments can be changed as appropriate without departing from the spirit of the present invention. The scope of the present invention is included within the scope of the invention described in the claims and their equivalents.

What is claimed is:

1. A display device comprising:

a case;

a circuit board including a first region and a second region positioned closer to an outer peripheral side than the first region, the circuit board further including a third region positioned closer to the outer peripheral side than the second region, and the circuit board having electronic components arranged in the first region, the second region, and the third region;

a light guide plate provided inside the case and arranged to face the first region and the second region of the circuit board; and an inner case member comprising a support frame portion and a cover portion, the support frame portion being arranged between the second region and the third region, and the cover portion facing the third region of the circuit board, wherein the electronic components are arranged to be spaced apart from the light guide plate and the cover portion of the inner case member, wherein the electronic components include one or more first electronic components in the first region, one or more second electronic components in the second region, and one or more third electronic components in the third region, wherein a distance between the light guide plate and an end surface of one of the first electronic components closest to the light guide plate is greater than a distance between the light guide plate and an end surface of one of the second electronic components closest to the light guide plate, and wherein the distance between the light guide plate and the end surface of one of the second electronic components closest to the light guide plate is greater than a distance between the cover portion and an end surface of one of the third electronic components closest to the cover portion.

2. The display device according to claim 1, further comprising a light emitting body arranged on the circuit board.

3. The display device according to claim 2, wherein the light emitting body comprises a plurality of light emitting bodies.

4. The display device according to claim 3, wherein in plan view from a viewing side, the second region covers an entire outer periphery of the first region, and the third region is disposed on an outer peripheral side of the second region and is disposed between the plurality of light emitting bodies.

5. A watch comprising:

the display device according to claim 2;

a watch case; and a watch module provided inside the watch case.

6. A watch comprising:

the display device according to claim 2;

a watch case; and a watch module provided inside the watch case, wherein the third region is disposed on a 6 o'clock side in plan view from a viewing side.

7. The display device according to claim 1, wherein the light guide plate is formed into a flat plate shape.

8. The display device according to claim 7, wherein the first region is a region containing a center of the circuit board.

9. The display device according to claim 1, wherein the light guide plate comprises a surface facing the circuit board, and the surface is parallel to the circuit board.

10. The display device according to claim 1, wherein the one or more first electronic components are smaller in maximum height than the one or more second electronic components.

11. The display device according to claim 10, wherein the one or more second electronic components are smaller in maximum height than the one or more third electronic components.

12. The display device according to claim 1, wherein the one or more first electronic components are smaller in maximum size in a facing direction than the one or more second electronic components.

13. The display device according to claim 12, wherein the one or more second electronic components are smaller in maximum size in the facing direction than the one or more third electronic components.

14. A watch comprising:

the display device according to claim 1;

a watch case; and a watch module provided inside the watch case.

* * * * *